(12) United States Patent
Tsai et al.

(10) Patent No.: US 10,209,495 B2
(45) Date of Patent: Feb. 19, 2019

(54) FOUR-PIECE INFRARED SINGLE WAVELENGTH LENS SYSTEM

(71) Applicant: NEWMAX TECHNOLOGY CO., LTD., Tai-Chung (TW)

(72) Inventors: Fei-Hsin Tsai, Tai-Chung (TW); Shu-Tzu Lai, Tai-Chung (TW)

(73) Assignee: Newmax Technology Co., Ltd., Taichung (TW)

( * ) Notice: Subject to any disclaimer, the term of this patent is extended or adjusted under 35 U.S.C. 154(b) by 0 days.

(21) Appl. No.: 15/642,993

(22) Filed: Jul. 6, 2017

(65) Prior Publication Data

US 2019/0011669 A1    Jan. 10, 2019

(51) Int. Cl.
| | |
|---|---|
| *G02B 13/18* | (2006.01) |
| *G02B 3/02* | (2006.01) |
| *G02B 13/00* | (2006.01) |
| *G02B 9/34* | (2006.01) |
| *G02B 27/00* | (2006.01) |

(52) U.S. Cl.
CPC ............. *G02B 13/008* (2013.01); *G02B 9/34* (2013.01); *G02B 13/004* (2013.01); *G02B 27/0025* (2013.01)

(58) Field of Classification Search
CPC ...... G02B 13/008; G02B 9/34; G02B 13/004; G02B 27/0025; G02B 13/14; G02B 13/146; G02B 19/009
See application file for complete search history.

(56) References Cited

U.S. PATENT DOCUMENTS

2012/0250164 A1\* 10/2012 Tsai et al. ............ G02B 13/004
                                                              359/715

FOREIGN PATENT DOCUMENTS

| TW | 201027116 A | 7/2010 |
|---|---|---|
| TW | 201104282 A | 2/2011 |

\* cited by examiner

*Primary Examiner* — Alicia M Harrington
(74) *Attorney, Agent, or Firm* — Gemini Patent Services, Inc.

(57) ABSTRACT

A four-piece infrared single wavelength lens system includes, in order from the object side to the image side: a stop, a first lens element with a positive refractive power, a second lens element with a positive refractive power, a third lens element with a negative refractive power, a fourth lens element with a positive refractive power. Such arrangements can provide a four-piece infrared single wavelength lens system which has a wide field of view, high resolution, short length and less distortion.

14 Claims, 12 Drawing Sheets

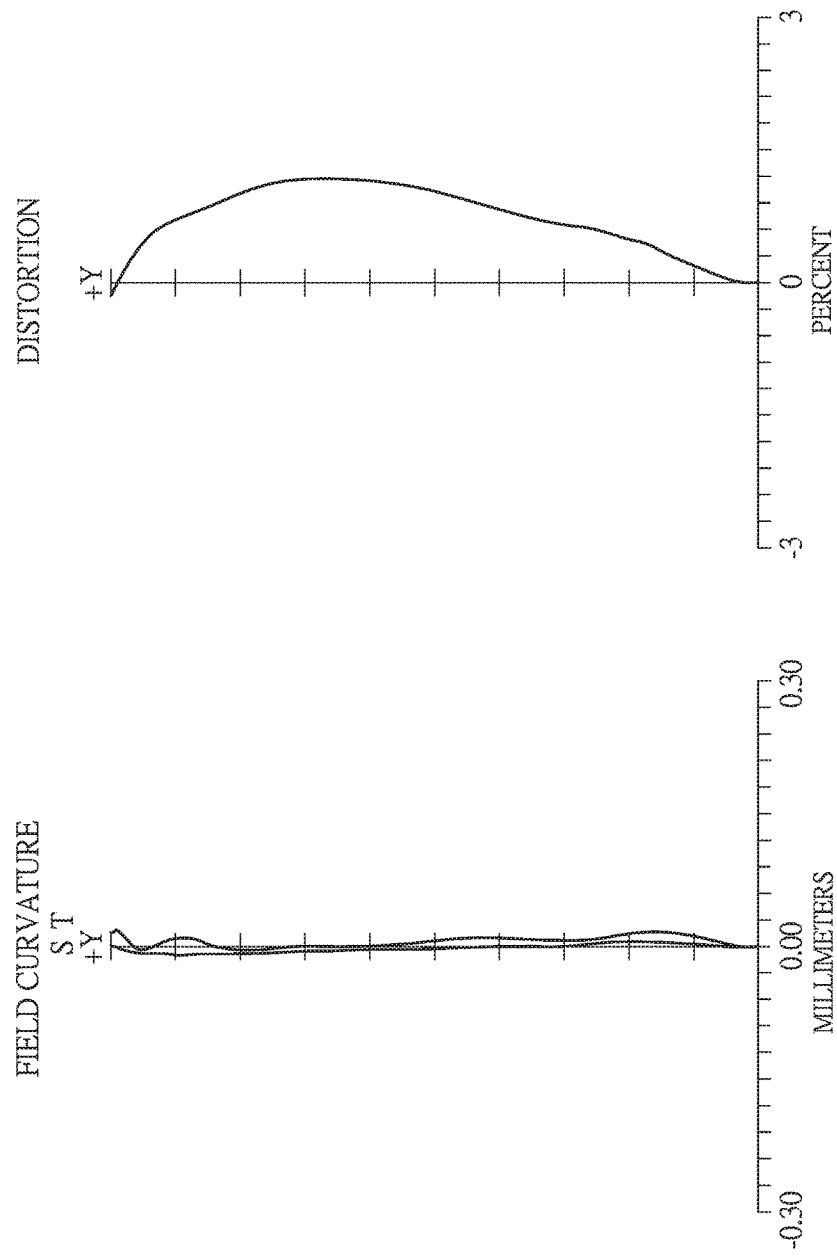

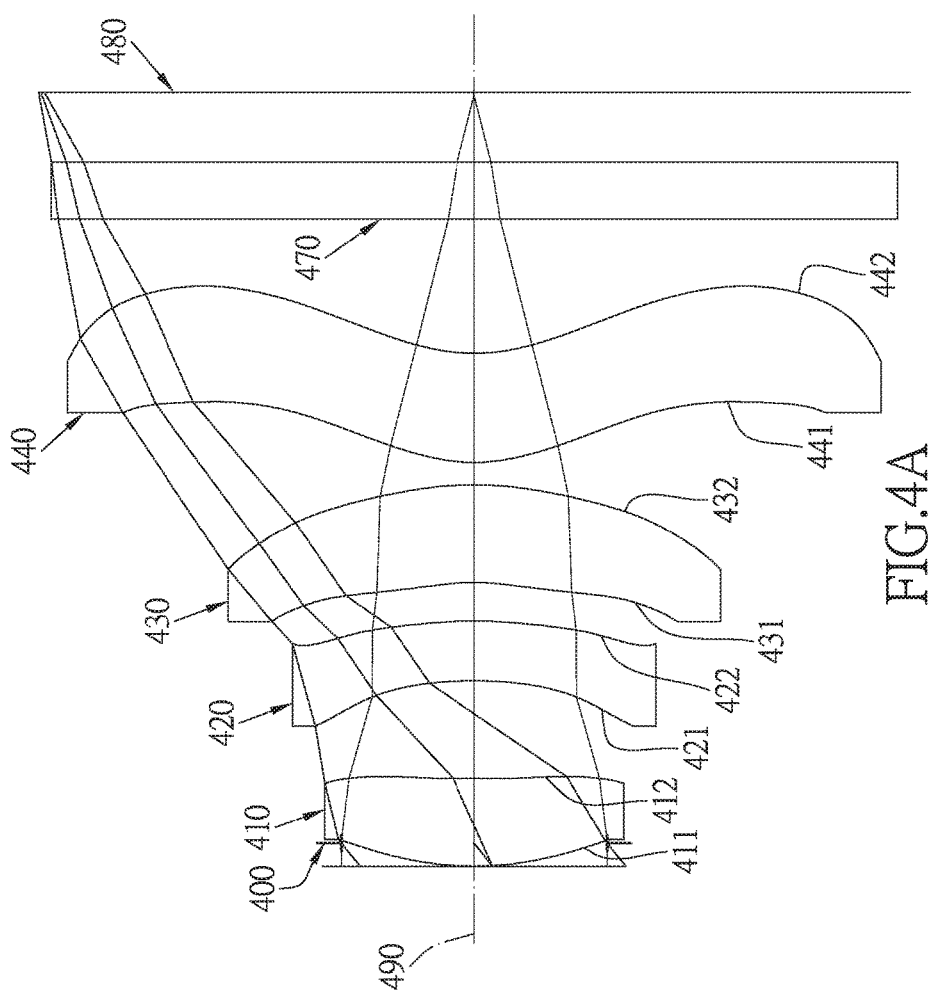

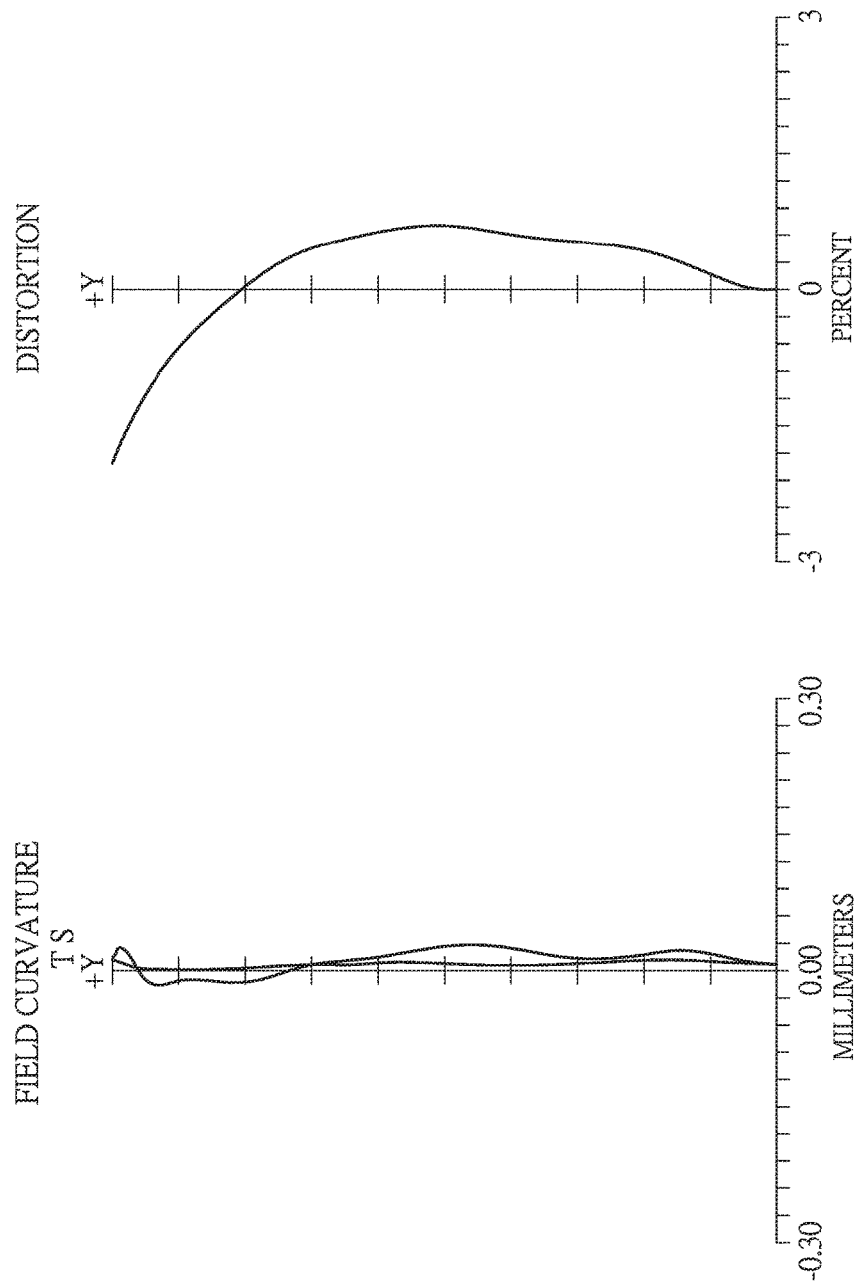

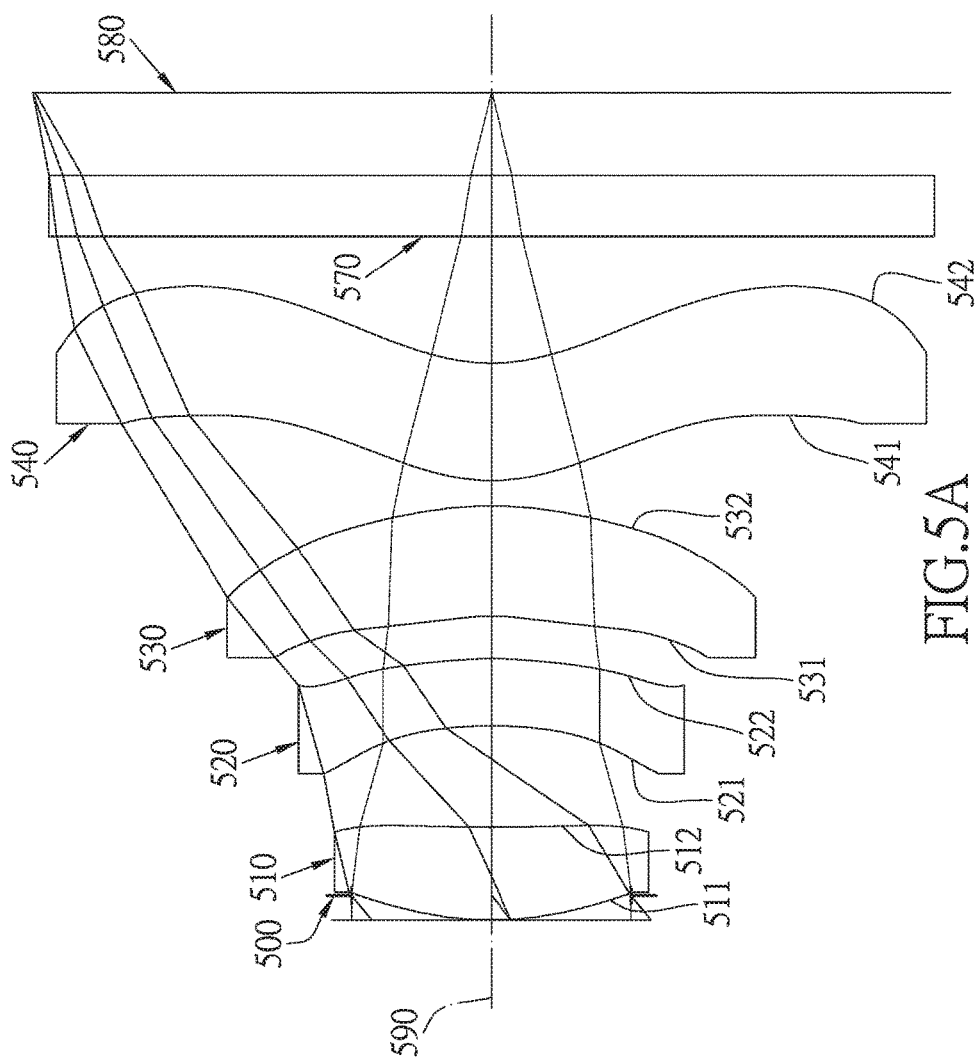

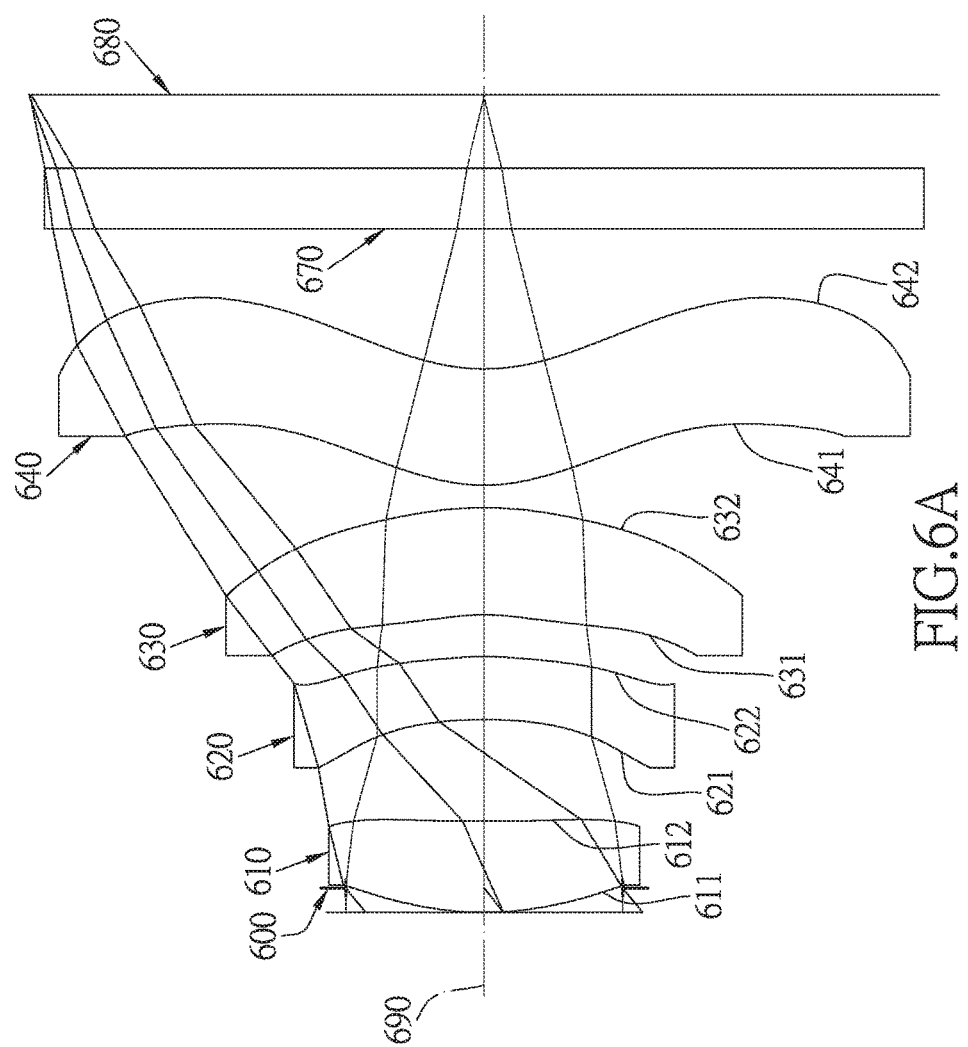

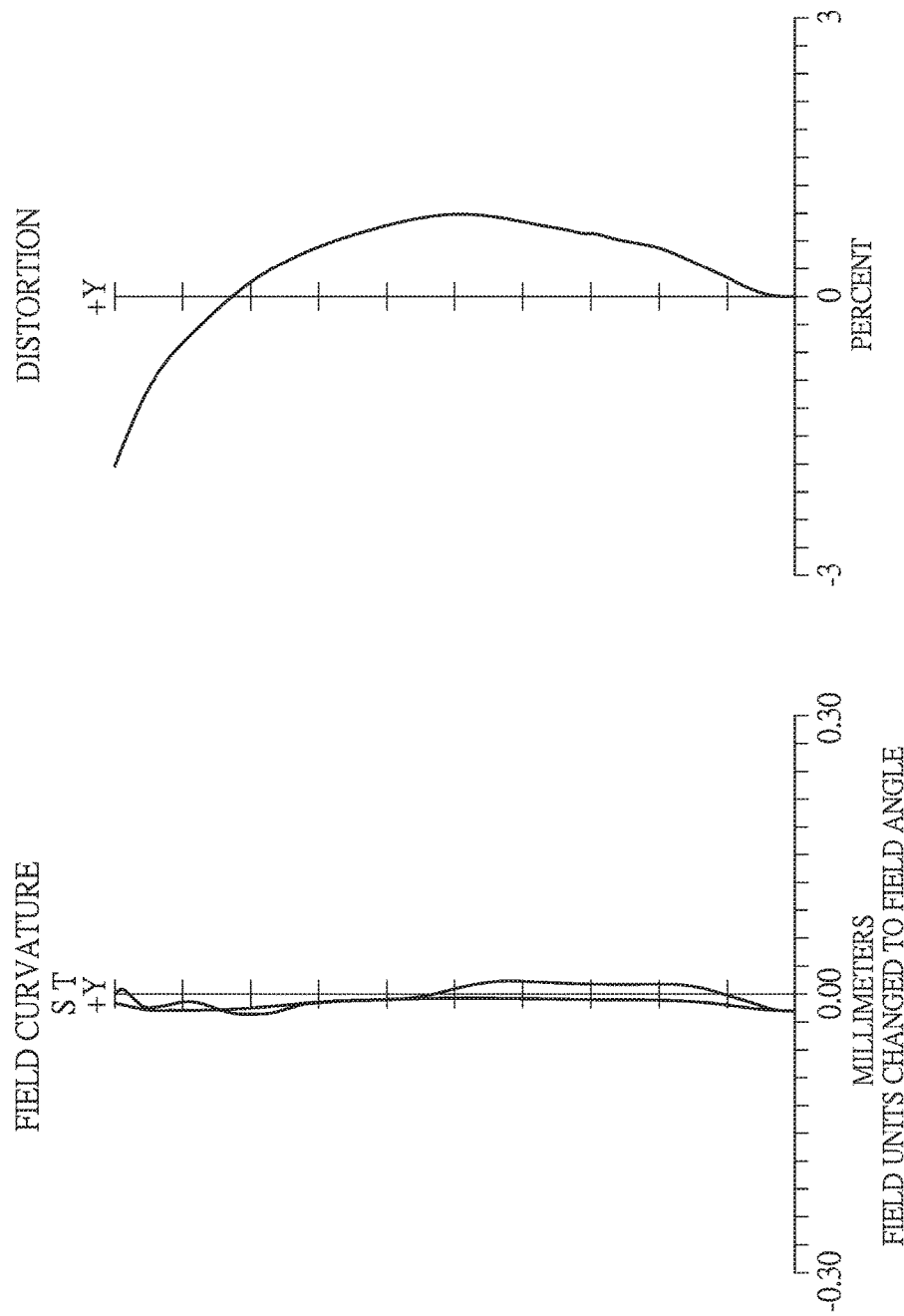

FOUR-PIECE INFRARED SINGLE WAVELENGTH LENS SYSTEM

BACKGROUND

Field of the Invention

The present invention relates to a four-piece infrared single wavelength lens system, and more particularly to a miniaturized four-piece infrared single wavelength lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, such as the single focus wide-angle lens modules disclosed in TW Appl. Nos. 098100552 and 098125378, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY

The primary objective of the present invention is to provide a four-piece infrared single wavelength lens system which has a wide field of view, high resolution, short length and less distortion.

Therefore, a four-piece infrared single wavelength lens system in accordance with the present invention comprises, in order from an object side to an image side: a stop; a first lens element with a positive refractive power having an object-side surface being convex near an optical axis and an image-side surface being concave near the optical axis, at least one of the object-side surface and the image-side surface of the first lens element being aspheric; a second lens element with a positive refractive power having an object-side surface being concave near the optical axis and an image-side surface being convex near the optical axis, at least one of the object-side surface and the image-side surface of the second lens element being aspheric; a third lens element with a negative refractive power having an object-side surface being concave near the optical axis and an image-side surface being convex near the optical axis, at least one of the object-side surface and the image-side surface of the third lens element being aspheric; and a fourth lens element with a positive refractive power having an object-side surface being convex near the optical axis and an image-side surface being concave near the optical axis, at least one of the object-side surface and the image-side surface of the fourth lens element being aspheric.

Preferably, a focal length of the first lens element is f1, a focal length of the second lens element is f2, and they satisfy the relation: $0.005<f1/f2<0.09$, so that the refractive power of the first lens element and the second lens element are more suitable, it will be favorable to avoid the excessive increase of aberration of the system.

Preferably, the focal length of the second lens element is f2, a focal length of the third lens element is f3, and they satisfy the relation: $-42<f2/f3<-3.2$, so that the refractive power of the second lens element and the third lens element are more balanced, it will be favorable to correct the aberration of the system and reduce the sensitivity of the system.

Preferably, the focal length of the third lens element is f3, a focal length of the fourth lens element is f4, and they satisfy the relation: $-2.1<f3/f4<-1.3$, which can effectively reduce the total length of the system.

Preferably, the focal length of the first lens element is f1, the focal length of the third lens element is f3, and they satisfy the relation: $-0.55<f1/f3<-0.15$, so that the refractive power of the first lens element can be distributed effectively, so as to reduce the sensitivity of the four-piece infrared single wavelength lens system.

Preferably, the focal length of the first lens element is f1, the focal length of the fourth lens element is f4, and they satisfy the relation: $0.35<f1/f4<0.77$, so that the refractive power of the first lens element can be distributed effectively, so as to reduce the sensitivity of the four-piece infrared single wavelength lens system.

Preferably, the focal length of the second lens element is f2, the focal length of the fourth lens element is f4, and they satisfy the relation: $6.0<f2/f4<68.5$, so that the distribution of the negative refractive power will be appropriate, it will be favorable to correct the aberration of the system and improve the image quality.

Preferably, the focal length of the first lens element is f1, a focal length of the second lens element and the third lens element combined is f23, and they satisfy the relation: $-0.55<f1/f23<-0.1$. If f1/f23 satisfies the above relation, the resolution can be improved evidently.

Preferably, a focal length of the first lens element and the second lens element combined is f12, a focal length of the third lens element and the fourth lens element combined is f34, and they satisfy the relation: $0.1<f12/f34<0.45$, which can effectively correct image distortion.

Preferably, the focal length of the second lens element is f2, the focal length of the third lens element and the fourth lens element combined is f34, and they satisfy the relation: $2.7<f2/f34<30$, which can effectively correct image distortion.

Preferably, the focal length of the second lens element and the third lens element combined is f23, the focal length of the fourth lens element is f4, and they satisfy the relation: $-2.5<f23/f4<1.2$. If f23/f4 satisfies the above relation, the resolution can be improved evidently.

Preferably, the focal length of the first lens element is f1, a focal length of the second lens element, the third lens element and the fourth lens element combined is f234, and they satisfy the relation: $0.13<f1/f234<0.5$. Appropriate refractive power is favorable to reduce the spherical aberration and astigmatism of the system effectively.

Preferably, a focal length of the first lens element, the second lens element and the third lens element combined is f123, the focal length of the fourth lens element is f4, and they satisfy the relation: $0.55<f123/f4<1.25$. Appropriate refractive power is favorable to reduce the spherical aberration and astigmatism of the system effectively.

Preferably, a refractive index of the fourth lens element is N4, an Abbe number of the fourth lens element is V4, and they satisfy the relations: $1.61<N4$; $V4<25$, which can reduce the chromatic aberration of the four-piece infrared single wavelength lens system and provide better aberration balance ability.

Preferably, a focal length of the four-piece infrared single wavelength lens system is f, a distance from the object-side surface of the first lens element to the image plane along the optical axis is TL, and they satisfy the relation: $0.5<f/TL<0.9$, it will be favorable to maintain the objective of miniaturization of the four-piece infrared single wavelength lens system, which can be used in thin electronic products.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 3B shows the image plane curve and the distortion curve of the third embodiment of the present invention;

FIG. 4A shows a four-piece infrared single wavelength lens system in accordance with a fourth embodiment of the present invention;

FIG. 4B shows the image plane curve and the distortion curve of the fourth embodiment of the present invention;

FIG. 5A shows a four-piece infrared single wavelength lens system in accordance with a fifth embodiment of the present invention;

FIG. 6A shows a four-piece infrared single wavelength lens system in accordance with a sixth embodiment of the present invention; and FIG. 6B shows the image plane curve and the distortion curve of the sixth embodiment of the present invention.

DETAILED DESCRIPTION

Figure 1A:
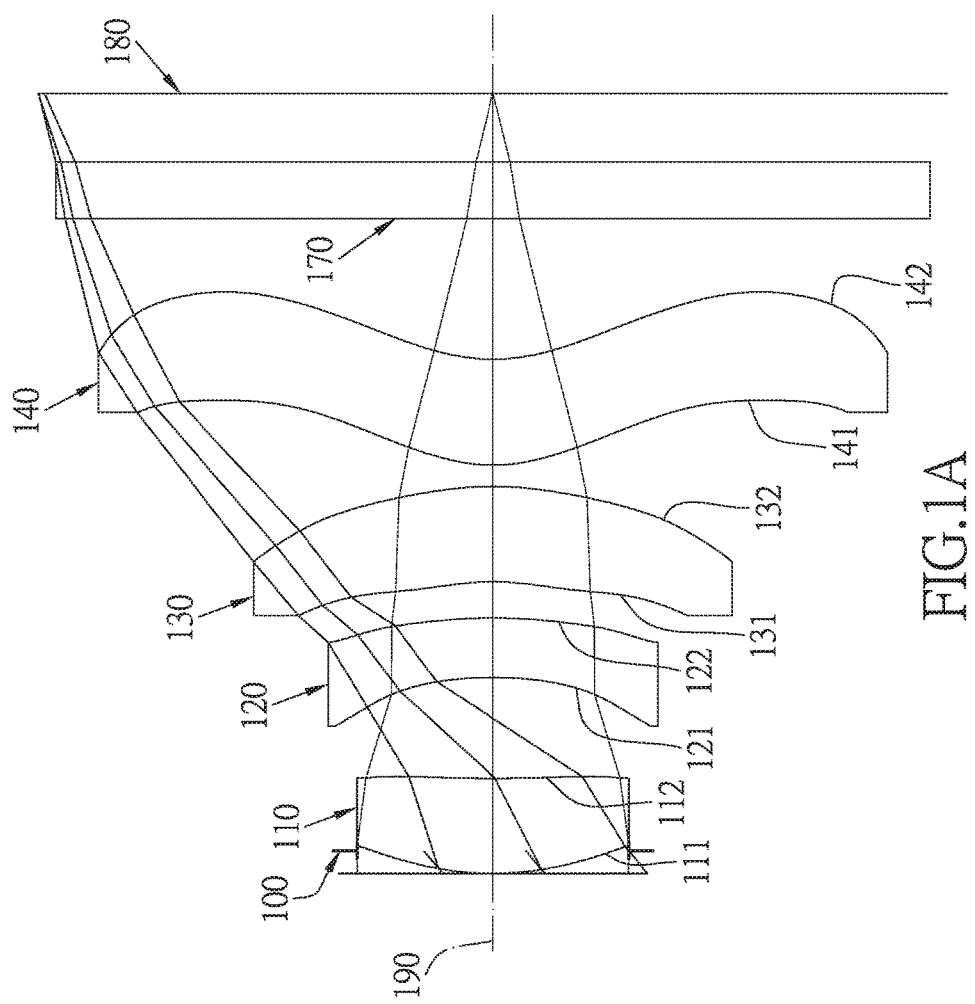
FIG. 1A shows a four-piece infrared single wavelength lens system in accordance with a first embodiment of the present invention.
Figure 1B:
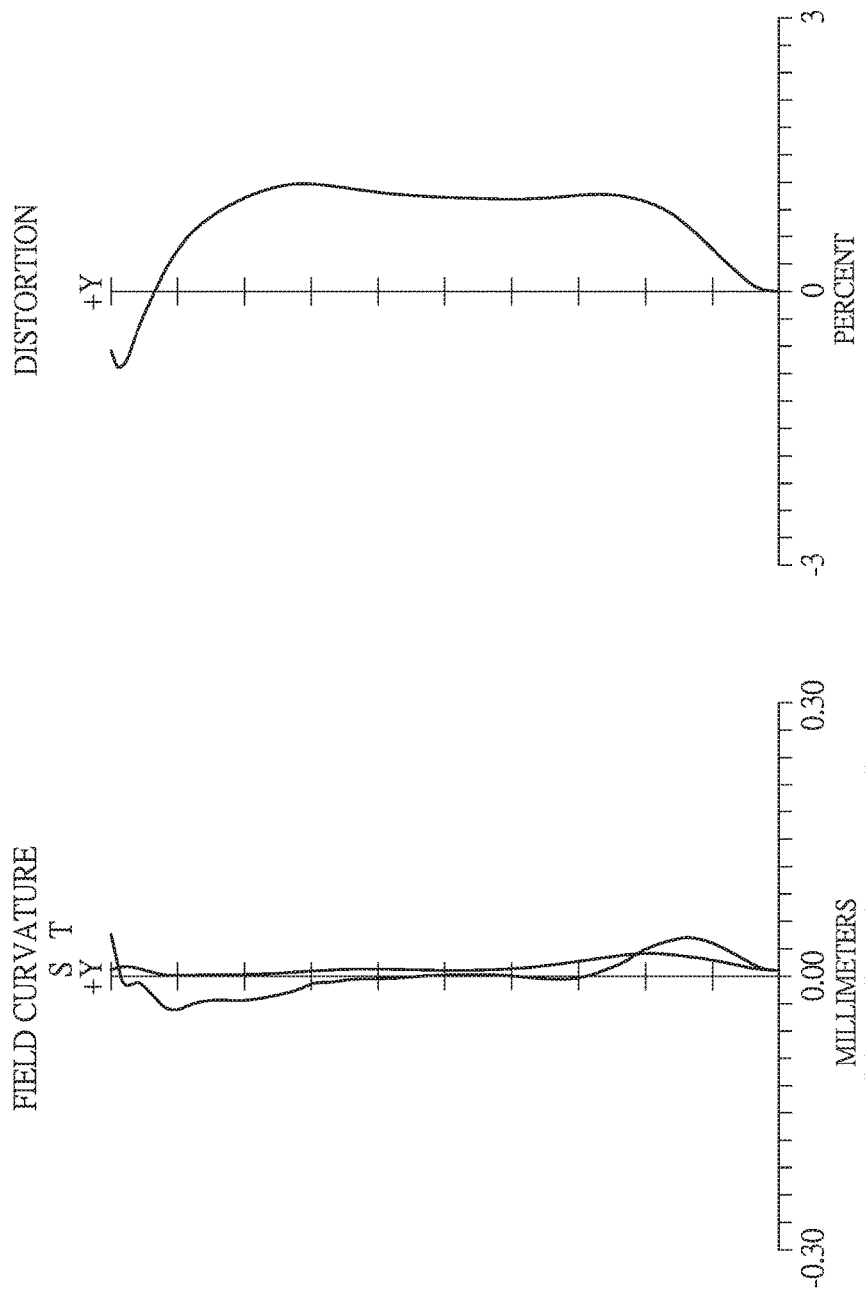
FIG. 1B shows the image plane curve and the distortion curve of the first embodiment of the present invention.

Referring to FIGS. 1A and 1B, FIG. 1A shows a four-piece infrared single wavelength lens system in accordance with a first embodiment of the present invention, and FIG. 1B shows, in order from left to right, the image plane curve and the distortion curve of the first embodiment of the present invention. A four-piece infrared single wavelength lens system in accordance with the first embodiment of the present invention comprises a stop 100 and a lens group. The lens group comprises, in order from an object side to an image side: a first lens element 110, a second lens element 120, a third lens element 130, a fourth lens element 140, an IR cut filter 170, and an image plane 180, wherein the four-piece infrared single wavelength lens system has a total of four lens elements with refractive power. The stop 100 is disposed between an object-side surface 111 and an image-side surface 112 of the first lens element 110.

The first lens element 110 with a positive refractive power has the object-side surface 111 being convex near an optical axis 190 and the image-side surface 112 being concave near the optical axis 190, the object-side surface 111 and the image-side surface 112 are aspheric, and the first lens element 110 is made of plastic material.

The second lens element 120 with a positive refractive power has an object-side surface 121 being concave near the optical axis 190 and an image-side surface 122 being convex near the optical axis 190, the object-side surface 121 and the image-side surface 122 are aspheric, and the second lens element 120 is made of plastic material.

The third lens element 130 with a negative refractive power has an object-side surface 131 being concave near the optical axis 190 and an image-side surface 132 being convex near the optical axis 190, the object-side surface 131 and the image-side surface 132 are aspheric, and the third lens element 130 is made of plastic material.

The fourth lens element 140 with a positive refractive power has an object-side surface 141 being convex near the optical axis 190 and an image-side surface 142 being concave near the optical axis 190, the object-side surface 141 and the image-side surface 142 are aspheric, the fourth lens element 140 is made of plastic material, and at least one of the object-side surface 141 and the image-side surface 142 is provided with at least one inflection point.

The IR cut filter 170 made of glass is located between the fourth lens element 140 and the image plane 180 and has no influence on the focal length of the four-piece infrared single wavelength lens system.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present four-piece infrared single wavelength lens system, a focal length of the four-piece infrared single wavelength lens system is f, a f-number of the four-piece infrared single wavelength lens system is Fno, the four-piece infrared single wavelength lens system has a maximum view angle (field of view) FOV, and they satisfy the relations: f=2.962 mm; Fno=2.0; and FOV=78.7 degrees.

In the first embodiment of the present four-piece infrared single wavelength lens system, a focal length of the first lens element 110 is f1, a focal length of the second lens element 120 is f2, and they satisfy the relation: f1/f2=0.09.

In the first embodiment of the present four-piece infrared single wavelength lens system, the focal length of the second lens element 120 is f2, a focal length of the third lens element 130 is f3, and they satisfy the relation: f2/f3=−41.366.

In the first embodiment of the present four-piece infrared single wavelength lens system, the focal length of the third lens element 130 is f3, a focal length of the fourth lens element 140 is f4, and they satisfy the relation: f3/f4=−1.603.

In the first embodiment of the present four-piece infrared single wavelength lens system, the focal length of the first lens element 110 is f1, the focal length of the third lens element 130 is f3, and they satisfy the relation: f1/f3=−0.390.

In the first embodiment of the present four-piece infrared single wavelength lens system, the focal length of the first lens element 110 is f1, the focal length of the fourth lens element 140 is f4, and they satisfy the relation: f1/f4=0.625.

In the first embodiment of the present four-piece infrared single wavelength lens system, the focal length of the second lens element 120 is f2, the focal length of the fourth lens element 140 is f4, and they satisfy the relation: f2/f4=66.328.

In the first embodiment of the present four-piece infrared single wavelength lens system, the focal length of the first lens element 110 is f1, a focal length of the second lens element 120 and the third lens element 130 combined is f23, and they satisfy the relation: f1/f23=−0.405.

In the first embodiment of the present four-piece infrared single wavelength lens system, a focal length of the first lens element 110 and the second lens element 120 combined is f12, a focal length of the third lens element 130 and the fourth lens element 140 combined is f34, and they satisfy the relation: f12/f34=0.279.

In the first embodiment of the present four-piece infrared single wavelength lens system, the focal length of the second lens element 120 and the third lens element 130 combined is f23, the focal length of the fourth lens element 140 is f4, and they satisfy the relation: f2/f34=28.143.

In the first embodiment of the present four-piece infrared single wavelength lens system, the focal length of the second lens element 120 and the third lens element 130 combined is f23, the focal length of the fourth lens element 140 is f4, and they satisfy the relation: f23/f4=−1.544.

In the first embodiment of the present four-piece infrared single wavelength lens system, the focal length of the first lens element 110 is f1, a focal length of the second lens element 120, the third lens element 130 and the fourth lens element 140 combined is f234, and they satisfy the relation: f1/f234=0.290.

In the first embodiment of the present four-piece infrared single wavelength lens system, a focal length of the first lens element 110, the second lens element 120 and the third lens element 130 combined is f123, the focal length of the fourth lens element 140 is f4, and they satisfy the relation: f123/f4=1.064.

In the first embodiment of the present four-piece infrared single wavelength lens system, the focal length of the four-piece infrared single wavelength lens system is f, a distance from the object-side surface 111 of the first lens element 110 to the image plane 180 along the optical axis 190 is TL, and they satisfy the relation: f/TL=0.713.

The detailed optical data of the first embodiment is shown in table 1, and the aspheric surface data is shown in table 2.

TABLE 1

Embodiment 1
f(focal length) = 2.962 mm, Fno = 2.0, FOV = 78.7 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.679 | (ASP) | 0.505 | plastic | 1.65 | 21.5 | 3.32 |
| 4 | | 7.786 | (ASP) | 0.537 | | | | |
| 5 | Lens 2 | −2.034 | (ASP) | 0.321 | plastic | 1.65 | 21.5 | 352.85 |
| 6 | | −2.137 | (ASP) | 0.192 | | | | |
| 7 | Lens 3 | −1.149 | (ASP) | 0.506 | plastic | 1.65 | 21.5 | −8.53 |
| 8 | | −1.714 | (ASP) | 0.114 | | | | |
| 9 | Lens 4 | 0.940 | (ASP) | 0.566 | plastic | 1.65 | 21.5 | 5.32 |
| 10 | | 1.008 | (ASP) | 0.748 | | | | |
| 11 | IR-filter | infinity | | 0.3 | glass | 1.517 | 64.2 | |
| 12 | | infinity | | 0.365 | | | | |
| 13 | Image plane | infinity | | infinity | | | | |

TABLE 2

Aspheric Coefficients

| surface | | | | |
|---|---|---|---|---|
| | 3 | 4 | 5 | 6 |
| K: | −6.5267E+00 | −1.4695E+02 | 1.7206E+00 | −7.4764E−01 |
| A: | 1.5932E−01 | −3.5706E−02 | −4.4303E−02 | 6.3123E−01 |
| B: | −1.7613E−01 | −1.5804E−01 | −7.2587E−01 | −1.8345E+00 |
| C: | 1.1130E−01 | 1.1179E−01 | 9.3403E−01 | 2.1178E+00 |
| D: | −1.9622E−01 | −4.6607E−01 | −2.9247E−01 | −1.3417E+00 |
| E: | 2.1483E−01 | 6.1997E−01 | 9.2081E−01 | 9.0257E−01 |
| F | −2.4444E−01 | −3.1940E−01 | −8.8603E−01 | −3.4990E−01 |

| surface | | | | |
|---|---|---|---|---|
| | 7 | 8 | 9 | 10 |
| K: | −1.4421E+01 | −2.5963E+01 | −9.5152E−01 | −7.9897E−01 |
| A: | 6.7506E−01 | −1.5436E−01 | −3.6503E−01 | −3.2051E−01 |
| B: | −1.5336E+00 | 2.8477E−01 | 1.9124E−01 | 1.2196E−01 |
| C: | 1.8650E+00 | −3.2527E−01 | −1.0483E−01 | −4.2205E−02 |

TABLE 2-continued

| Aspheric Coefficients | | | | |
|---|---|---|---|---|
| D: | −1.9667E+00 | 8.4559E−02 | 4.1103E−02 | 8.6720E−03 |
| E: | 1.4346E+00 | 5.6954E−02 | −8.5280E−03 | −8.5100E−04 |
| F | −4.3944E−01 | −2.5442E−02 | 6.8700E−04 | 1.1000E−05 |

The units of the radius of curvature, the thickness and the focal length in table 1 are expressed in mm, the surface numbers 0-13 represent the surfaces sequentially arranged from the object-side to the image-side along the optical axis. In table 2, k represents the conic coefficient of the equation of the aspheric surface profiles, and A, B, C, D, E, F . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
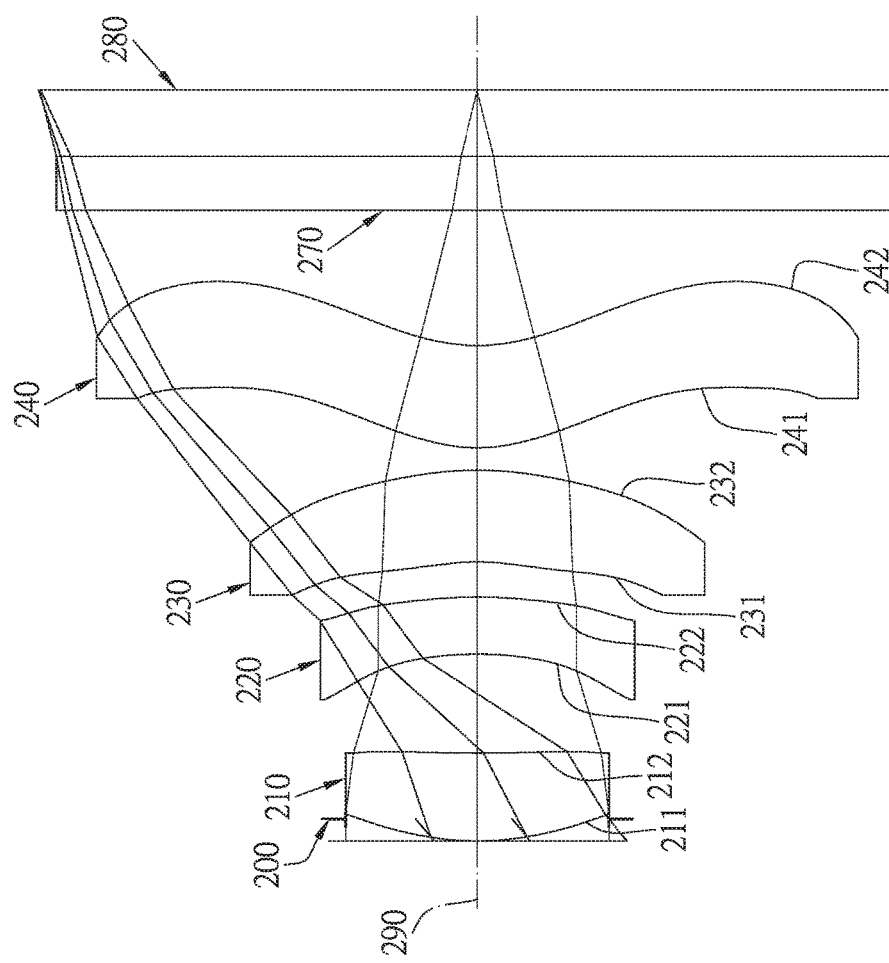
FIG. 2A shows a four-piece infrared single wavelength lens system in accordance with a second embodiment of the present invention.
Figure 2B:
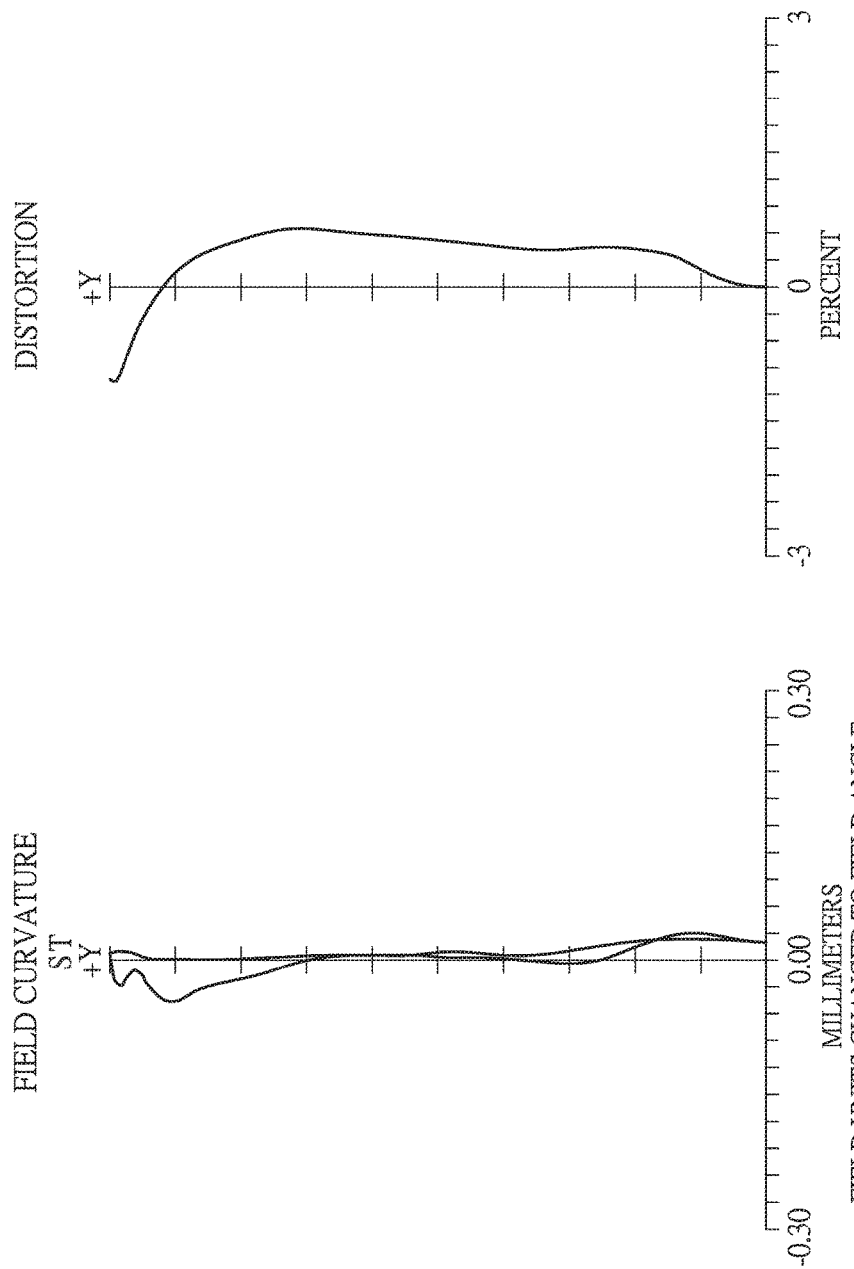
FIG. 2B shows the image plane curve and the distortion curve of the second embodiment of the present invention.

Referring to FIGS. 2A and 2B, FIG. 2A shows a four-piece infrared single wavelength lens system in accordance with a second embodiment of the present invention, and FIG. 2B shows, in order from left to right, the image plane curve and the distortion curve of the second embodiment of the present invention. A four-piece infrared single wavelength lens system in accordance with the second embodiment of the present invention comprises a stop 200 and a lens group. The lens group comprises, in order from an object side to an image side: a first lens element 210, a second lens element 220, a third lens element 230, a fourth lens element 240, an IR cut filter 270, and an image plane 280, wherein the four-piece infrared single wavelength lens system has a total of four lens elements with refractive power. The stop 200 is disposed between an object-side surface 211 and an image-side surface 212 of the first lens element 210.

The first lens element 210 with a positive refractive power has the object-side surface 211 being convex near an optical axis 290 and the image-side surface 212 being concave near the optical axis 290, the object-side surface 211 and the image-side surface 212 are aspheric, and the first lens element 210 is made of plastic material.

The second lens element 220 with a positive refractive power has an object-side surface 221 being concave near the optical axis 290 and an image-side surface 222 being convex near the optical axis 290, the object-side surface 221 and the image-side surface 222 are aspheric, and the second lens element 220 is made of plastic material.

The third lens element 230 with a negative refractive power has an object-side surface 231 being concave near the optical axis 290 and an image-side surface 232 being convex near the optical axis 290, the object-side surface 231 and the image-side surface 232 are aspheric, and the third lens element 230 is made of plastic material.

The fourth lens element 240 with a positive refractive power has an object-side surface 241 being convex near the optical axis 290 and an image-side surface 242 being concave near the optical axis 290, the object-side surface 241 and the image-side surface 242 are aspheric, the fourth lens element 240 is made of plastic material, and at least one of the object-side surface 241 and the image-side surface 242 is provided with at least one inflection point.

The IR cut filter 270 made of glass is located between the fourth lens element 240 and the image plane 280 and has no influence on the focal length of the four-piece infrared single wavelength lens system.

The detailed optical data of the second embodiment is shown in table 3, and the aspheric surface data is shown in table 4.

TABLE 3

Embodiment 2
f(focal length) = 2.974 mm, Fno = 2.0, FOV = 79 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.692 | (ASP) | 0.484 | plastic | 1.65 | 21.5 | 3.34 |
| 4 | | 8.008 | (ASP) | 0.546 | | | | |
| 5 | Lens 2 | −2.045 | (ASP) | 0.319 | plastic | 1.65 | 21.5 | 379.00 |
| 6 | | −2.148 | (ASP) | 0.194 | | | | |
| 7 | Lens 3 | −1.172 | (ASP) | 0.505 | plastic | 1.65 | 21.5 | −9.16 |
| 8 | | −1.718 | (ASP) | 0.122 | | | | |
| 9 | Lens 4 | 0.954 | (ASP) | 0.567 | plastic | 1.65 | 21.5 | 5.60 |
| 10 | | 1.014 | (ASP) | 0.744 | | | | |
| 11 | IR-filter | infinity | | 0.3 | glass | 1.517 | 64.2 | |
| 12 | | infinity | | 0.365 | | | | |
| 13 | Image plane | infinity | | infinity | | | | |

TABLE 4

| Aspheric Coefficients | | | | |
|---|---|---|---|---|
| | surface | | | |
| | 3 | 4 | 5 | 6 |
| K: | −6.6492E+00 | −1.7148E+02 | 1.5854E+00 | −6.4621E−01 |
| A: | 1.5600E−01 | −3.5026E−02 | −4.2226E−02 | 6.3031E−01 |
| B: | −1.7992E−01 | −1.5183E−01 | −7.1548E−01 | −1.8388E+00 |
| C: | 1.1140E−01 | 1.1305E−01 | 9.4217E−01 | 2.1181E+00 |
| D: | −1.9274E−01 | −4.6700E−01 | −2.8779E−01 | −1.3390E+00 |
| E: | 2.1906E−01 | 6.2123E−01 | 9.2263E−01 | 9.0509E−01 |
| F | −2.4314E−01 | −3.0899E−01 | −8.8819E−01 | −3.4831E−01 |
| | surface | | | |
| | 7 | 8 | 9 | 10 |
| K: | −1.4071E+01 | −2.1856E+01 | −9.4836E−01 | −7.9939E−01 |
| A: | 6.6874E−01 | −1.5342E−01 | −3.6440E−01 | −3.2013E−01 |
| B: | −1.5310E+00 | 2.8320E−01 | 1.9139E−01 | 1.2206E−01 |

TABLE 4-continued

| Aspheric Coefficients | | | | |
|---|---|---|---|---|
| C: | 1.8625E+00 | −3.2555E−01 | −1.0481E−01 | −4.2182E−02 |
| D: | −1.9727E+00 | 8.4369E−02 | 4.1103E−02 | 8.6780E−03 |
| E: | 1.4327E+00 | 5.6751E−02 | −8.5290E−03 | −8.4900E−04 |
| F | −4.3275E−01 | −2.5133E−02 | 6.8700E−04 | 1.1000E−05 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 2.974 | f2/f4 | 67.701 |
| Fno | 2.0 | f1/f23 | −0.379 |
| FOV[deg.] | 79 | f12/f34 | 0.274 |
| f1/f2 | 0.009 | f2/f34 | 29.534 |
| f2/f3 | −41.392 | f23/f4 | −1.576 |
| f3/f4 | −1.636 | f1/f234 | 0.285 |
| f1/f3 | −0.365 | f123/f4 | 0.990 |
| f1/f4 | 0.597 | f/TL | 0.718 |

Figure 3A:
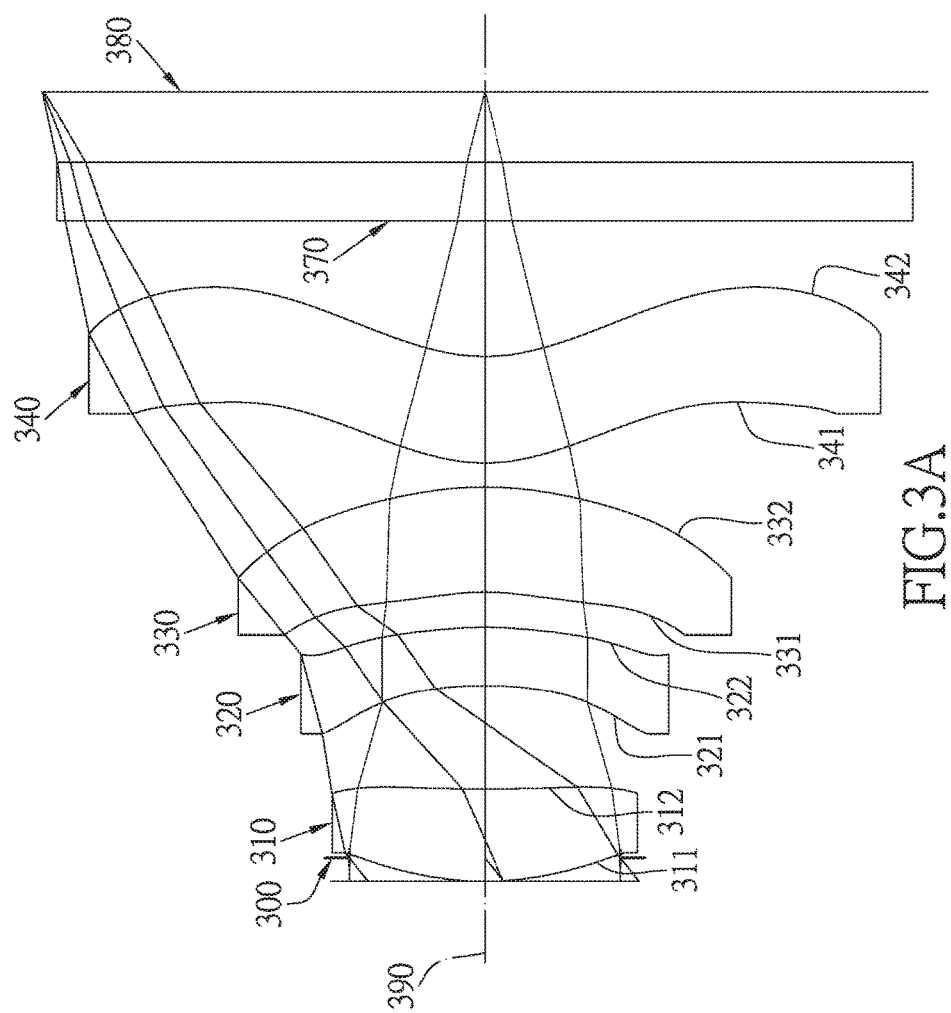
FIG. 3A shows a four-piece infrared single wavelength lens system in accordance with a third embodiment of the present invention.

Referring to FIGS. 3A and 3B, FIG. 3A shows a four-piece infrared single wavelength lens system in accordance with a third embodiment of the present invention, and FIG. 3B shows, in order from left to right, the image plane curve and the distortion curve of the third embodiment of the present invention. A four-piece infrared single wavelength lens system in accordance with the third embodiment of the present invention comprises a stop 300 and a lens group. The lens group comprises, in order from an object side to an image side: a first lens element 310, a second lens element 320, a third lens element 330, a fourth lens element 340, an IR cut filter 370, and an image plane 380, wherein the four-piece infrared single wavelength lens system has a total of four lens elements with refractive power. The stop 300 is disposed between an object-side surface 311 and an image-side surface 312 of the first lens element 310.

The first lens element 310 with a positive refractive power has the object-side surface 311 being convex near an optical axis 390 and the image-side surface 312 being concave near the optical axis 390, the object-side surface 311 and the image-side surface 312 are aspheric, and the first lens element 310 is made of plastic material.

The second lens element 320 with a positive refractive power has an object-side surface 321 being concave near the optical axis 390 and an image-side surface 322 being convex near the optical axis 390, the object-side surface 321 and the image-side surface 322 are aspheric, and the second lens element 320 is made of plastic material.

The third lens element 330 with a negative refractive power has an object-side surface 331 being concave near the optical axis 390 and an image-side surface 332 being convex near the optical axis 390, the object-side surface 331 and the image-side surface 332 are aspheric, and the third lens element 330 is made of plastic material.

The fourth lens element 340 with a positive refractive power has an object-side surface 341 being convex near the optical axis 390 and an image-side surface 342 being concave near the optical axis 390, the object-side surface 341 and the image-side surface 342 are aspheric, the fourth lens element 340 is made of plastic material, and at least one of the object-side surface 341 and the image-side surface 342 is provided with at least one inflection point.

The IR cut filter 370 made of glass is located between the fourth lens element 340 and the image plane 380 and has no influence on the focal length of the four-piece infrared single wavelength lens system.

The detailed optical data of the third embodiment is shown in table 5, and the aspheric surface data is shown in table 6.

TABLE 5

Embodiment 3
f(focal length) = 2.853 mm, Fno = 2.0, FOV = 76.9 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.658 | (ASP) | 0.474 | plastic | 1.65 | 21.5 | 3.31 |
| 4 | | 7.506 | (ASP) | 0.533 | | | | |
| 5 | Lens 2 | −2.004 | (ASP) | 0.300 | plastic | 1.65 | 21.5 | 43.54 |
| 6 | | −1.974 | (ASP) | 0.181 | | | | |
| 7 | Lens 3 | −1.201 | (ASP) | 0.539 | plastic | 1.65 | 21.5 | −10.71 |
| 8 | | −1.717 | (ASP) | 0.122 | | | | |
| 9 | Lens 4 | 0.956 | (ASP) | 0.550 | plastic | 1.65 | 21.5 | 6.26 |
| 10 | | 0.987 | (ASP) | 0.696 | | | | |
| 11 | IR-filter | infinity | | 0.3 | glass | 1.517 | 64.2 | |
| 12 | | infinity | | 0.365 | | | | |
| 13 | Image plane | infinity | | infinity | | | | |

TABLE 6

| Aspheric Coefficients | | | |
|---|---|---|---|
| surface | | | |
| 3 | 4 | 5 | 6 |
| K: −6.5773E+00 | −1.1242E+02 | 1.7359E+00 | −3.8612E−01 |
| A: 1.5843E−01 | −4.3452E−02 | −5.8098E−02 | 6.2426E−01 |
| B: −1.7707E−01 | −1.5520E−01 | −7.2591E−01 | −1.8306E+00 |
| C: 1.1092E−01 | 1.2185E−01 | 9.8246E−01 | 2.1229E+00 |

TABLE 6-continued

Aspheric Coefficients

| | | | | |
|---|---|---|---|---|
| D: | −2.1334E−01 | −4.9657E−01 | −2.5189E−01 | −1.3213E+00 |
| E: | 2.2615E−01 | 5.9533E−01 | 9.3169E−01 | 9.1464E−01 |
| F | −2.7894E−01 | −2.5551E−01 | −9.1004E−01 | −3.5629E−01 |

| surface | | | | |
|---|---|---|---|---|
| | 7 | 8 | 9 | 10 |
| K: | −1.2600E+01 | −1.8991E+01 | −9.8415E−01 | −8.3364E−01 |
| A: | 6.5756E−01 | −1.8488E−01 | −3.6354E−01 | −3.2663E−01 |
| B: | −1.5397E+00 | 3.0786E−01 | 1.8958E−01 | 1.2420E−01 |
| C: | 1.8805E+00 | −3.2318E−01 | −1.0438E−01 | −4.2199E−02 |
| D: | −1.9680E+00 | 7.7491E−02 | 4.1272E−02 | 8.6440E−03 |
| E: | 1.4189E+00 | 5.3237E−02 | −8.5170E−03 | −8.3900E−04 |
| F | −4.4245E−01 | −2.3297E−02 | 6.7400E−04 | 1.3000E−05 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 2.853 | f2/f4 | 6.951 |
| Fno | 2.0 | f1/f23 | −0.259 |
| FOV[deg.] | 76.9 | f12/f34 | 0.251 |
| f1/f2 | 0.076 | f2/f34 | 3.290 |
| f2/f3 | −4.067 | f23/f4 | −2.042 |
| f3/f4 | −1.709 | f1/f234 | 0.339 |
| f1/f3 | −0.309 | f123/f4 | 0.785 |
| f1/f4 | 0.528 | f/TL | 0.703 |

Referring to FIGS. 4A and 4B, FIG. 4A shows a four-piece infrared single wavelength lens system in accordance with a fourth embodiment of the present invention, and FIG. 4B shows, in order from left to right, the image plane curve and the distortion curve of the fourth embodiment of the present invention. A four-piece infrared single wavelength lens system in accordance with the fourth embodiment of the present invention comprises a stop 400 and a lens group. The lens group comprises, in order from an object side to an image side: a first lens element 410, a second lens element 420, a third lens element 430, a fourth lens element 440, an IR cut filter 470, and an image plane 480, wherein the four-piece infrared single wavelength lens system has a total of four lens elements with refractive power. The stop 400 is disposed between an object-side surface 411 and an image-side surface 412 of the first lens element 410.

The first lens element 410 with a positive refractive power has the object-side surface 411 being convex near an optical axis 490 and the image-side surface 412 being concave near the optical axis 490, the object-side surface 411 and the image-side surface 412 are aspheric, and the first lens element 410 is made of plastic material.

The second lens element 420 with a positive refractive power has an object-side surface 421 being concave near the optical axis 490 and an image-side surface 422 being convex near the optical axis 490, the object-side surface 421 and the image-side surface 422 are aspheric, and the second lens element 420 is made of plastic material.

The third lens element 430 with a negative refractive power has an object-side surface 431 being concave near the optical axis 490 and an image-side surface 432 being convex near the optical axis 490, the object-side surface 431 and the image-side surface 432 are aspheric, and the third lens element 430 is made of plastic material.

The fourth lens element 440 with a positive refractive power has an object-side surface 441 being convex near the optical axis 490 and an image-side surface 442 being concave near the optical axis 490, the object-side surface 441 and the image-side surface 442 are aspheric, the fourth lens element 440 is made of plastic material, and at least one of the object-side surface 441 and the image-side surface 442 is provided with at least one inflection point.

The IR cut filter 470 made of glass is located between the fourth lens element 440 and the image plane 480 and has no influence on the focal length of the four-piece infrared single wavelength lens system.

The detailed optical data of the fourth embodiment is shown in table 7, and the aspheric surface data is shown in table 8.

TABLE 7

Embodiment 4
f(focal length) = 2.855 mm, Fno = 2.0, FOV = 78 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.696 | (ASP) | 0.462 | plastic | 1.661 | 20.4 | 3.35 |
| 4 | | 7.599 | (ASP) | 0.512 | | | | |
| 5 | Lens 2 | −2.100 | (ASP) | 0.313 | plastic | 1.661 | 20.4 | 58.84 |
| 6 | | −2.103 | (ASP) | 0.201 | | | | |
| 7 | Lens 3 | −1.212 | (ASP) | 0.515 | plastic | 1.661 | 20.4 | −10.42 |
| 8 | | −1.728 | (ASP) | 0.117 | | | | |
| 9 | Lens 4 | 0.972 | (ASP) | 0.572 | plastic | 1.661 | 20.4 | 5.96 |
| 10 | | 1.011 | (ASP) | 0.704 | | | | |
| 11 | IR-filter | infinity | | 0.3 | glass | 1.517 | 64.2 | |
| 12 | | infinity | | 0.365 | | | | |
| 13 | Image plane | infinity | | infinity | | | | |

TABLE 8

Aspheric Coefficients

| | surface | | | |
|---|---|---|---|---|
| | 3 | 4 | 5 | 6 |
| K: | −6.8246E+00 | −1.7055E+02 | 1.6461E+00 | −6.1148E−01 |
| A: | 1.5482E−01 | −3.9271E−02 | −4.3192E−02 | 6.2907E−01 |
| B: | −1.8487E−01 | −1.5927E−01 | −7.1753E−01 | −1.8318E+00 |
| C: | 1.0262E−01 | 9.9281E−02 | 9.5669E−01 | 2.1348E+00 |
| D: | −1.9769E−01 | −4.8807E−01 | −2.6996E−01 | −1.3225E+00 |
| E: | 2.1613E−01 | 6.2845E−01 | 9.0112E−01 | 9.0233E−01 |
| F | −2.9139E−01 | −3.0062E−01 | −9.0112E−01 | −3.6907E−01 |

| | surface | | | |
|---|---|---|---|---|
| | 7 | 8 | 9 | 10 |
| K: | −1.3664E+01 | −1.9942E+01 | −9.4687E−01 | −8.0878E−01 |
| A: | 6.6619E−01 | −1.5415E−01 | −3.6471E−01 | −3.2230E−01 |
| B: | −1.5174E+00 | 2.8817E−01 | 1.9169E−01 | 1.2387E−01 |
| C: | 1.8743E+00 | −3.2499E−01 | −1.0469E−01 | −4.2475E−02 |
| D: | −1.9775E+00 | 8.2781E−02 | 4.1125E−02 | 8.6680E−03 |
| E: | 1.4197E+00 | 5.6011E−02 | −8.5310E−03 | −8.4000E−04 |
| F | −4.3269E−01 | −2.5032E−02 | 6.8200E−04 | 1.2000E−05 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 2.855 | f2/f4 | 9.881 |
| Fno | 2.0 | f1/f23 | −0.288 |
| FOV[deg.] | 78 | f12/f34 | 0.274 |
| f1/f2 | 0.057 | f2/f34 | 4.739 |
| f2/f3 | −5.645 | f23/f4 | −1.950 |
| f3/f4 | −1.750 | f1/f234 | 0.341 |
| f1/f3 | −0.321 | f123/f4 | 0.856 |
| f1/f4 | 0.562 | f/TL | 0.703 |

Figure 5B:
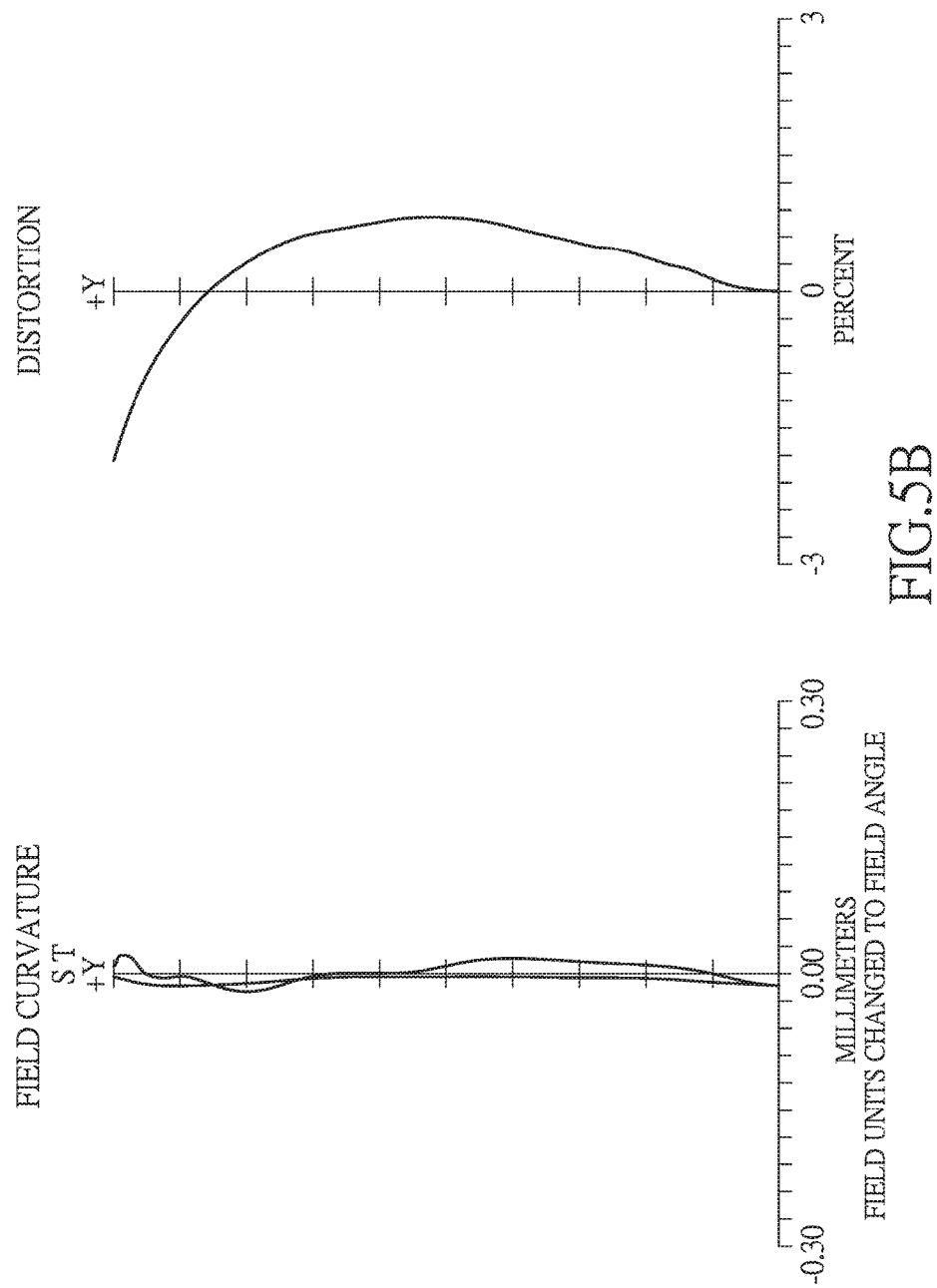
FIG. 5B shows the image plane curve and the distortion curve of the fifth embodiment of the present invention.

Referring to FIGS. 5A and 5B, FIG. 5A shows a four-piece infrared single wavelength lens system in accordance with a fifth embodiment of the present invention, and FIG. 5B shows, in order from left to right, the image plane curve and the distortion curve of the fifth embodiment of the present invention. A four-piece infrared single wavelength lens system in accordance with the fifth embodiment of the present invention comprises a stop 500 and a lens group. The lens group comprises, in order from an object side to an image side: a first lens element 510, a second lens element 520, a third lens element 530, a fourth lens element 540, an IR cut filter 570, and an image plane 580, wherein the four-piece infrared single wavelength lens system has a total of four lens elements with refractive power. The stop 500 is disposed between an object-side surface 511 and an image-side surface 512 of the first lens element 510.

The first lens element 510 with a positive refractive power has the object-side surface 511 being convex near an optical axis 590 and the image-side surface 512 being concave near the optical axis 590, the object-side surface 511 and the image-side surface 512 are aspheric, and the first lens element 510 is made of plastic material.

The second lens element 520 with a positive refractive power has an object-side surface 521 being concave near the optical axis 590 and an image-side surface 522 being convex near the optical axis 590, the object-side surface 521 and the image-side surface 522 are aspheric, and the second lens element 520 is made of plastic material.

The third lens element 530 with a negative refractive power has an object-side surface 531 being concave near the optical axis 590 and an image-side surface 532 being convex near the optical axis 590, the object-side surface 531 and the image-side surface 532 are aspheric, and the third lens element 530 is made of plastic material.

The fourth lens element 540 with a positive refractive power has an object-side surface 541 being convex near the optical axis 590 and an image-side surface 542 being concave near the optical axis 590, the object-side surface 541 and the image-side surface 542 are aspheric, the fourth lens element 540 is made of plastic material, and at least one of the object-side surface 541 and the image-side surface 542 is provided with at least one inflection point.

The IR cut filter 570 made of glass is located between the fourth lens element 540 and the image plane 580 and has no influence on the focal length of the four-piece infrared single wavelength lens system.

The detailed optical data of the fifth embodiment is shown in table 9, and the aspheric surface data is shown in table 10.

TABLE 9

Embodiment 5
f(focal length) = 2.833 mm, Fno = 2.0, FOV = 78 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.699 | (ASP) | 0.461 | plastic | 1.65 | 21.5 | 3.36 |
| 4 | | 8.014 | (ASP) | 0.502 | | | | |
| 5 | Lens 2 | −2.079 | (ASP) | 0.331 | plastic | 1.65 | 21.5 | 43.30 |
| 6 | | −2.048 | (ASP) | 0.210 | | | | |
| 7 | Lens 3 | −1.289 | (ASP) | 0.549 | plastic | 1.65 | 21.5 | −11.61 |
| 8 | | −1.825 | (ASP) | 0.125 | | | | |
| 9 | Lens 4 | 0.963 | (ASP) | 0.580 | plastic | 1.65 | 21.5 | 6.41 |
| 10 | | 0.975 | (ASP) | 0.630 | | | | |
| 11 | IR-filter | infinity | | 0.3 | glass | 1.517 | 64.2 | |
| 12 | | infinity | | 0.41 | | | | |
| 13 | Image plane | infinity | | infinity | | | | |

TABLE 10

Aspheric Coefficients

| surface | | | | |
|---|---|---|---|---|
| | 3 | 4 | 5 | 6 |
| K: | −6.9539E+00 | −1.6147E+02 | 1.4684E+00 | −1.7741E−01 |
| A: | 1.5452E−01 | −4.0875E−02 | −3.7126E−02 | 6.2180E−01 |
| B: | −1.8212E−01 | −1.6816E−01 | −7.3189E−01 | −1.8226E+00 |
| C: | 1.0848E−01 | 8.6652E−02 | 9.1943E−01 | 2.1507E+00 |
| D: | −2.0799E−01 | −4.6537E−01 | −2.3471E−01 | −1.3277E+00 |
| E: | 1.8599E−01 | 8.2521E−01 | 1.0814E+00 | 8.7852E−01 |
| F | −2.3929E−01 | −5.4007E−01 | −1.0937E+00 | −3.5864E−01 |

| surface | | | | |
|---|---|---|---|---|
| | 7 | 8 | 9 | 10 |
| K: | −1.3206E+01 | −1.9614E+01 | −9.5041E−01 | −8.1754E−01 |
| A: | 6.6147E−01 | −1.6333E−01 | −3.6499E−01 | −3.3037E−01 |
| B: | −1.5210E+00 | 2.9764E−01 | 1.9174E−01 | 1.2662E−01 |
| C: | 1.8803E+00 | −3.2596E−01 | −1.0480E−01 | −4.2630E−02 |
| D: | −1.9667E+00 | 8.0799E−02 | 4.1133E−02 | 8.5670E−03 |
| E: | 1.4209E+00 | 5.6231E−02 | −8.5320E−03 | −8.4800E−04 |
| F | −4.3929E−01 | −2.4589E−02 | 6.8500E−04 | 1.6000E−05 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 2.833 | f2/f4 | 6.759 |
| Fno | 2.0 | f1/f23 | −0.237 |
| FOV[deg.] | 78 | f12/f34 | 0.262 |
| f1/f2 | 0.078 | f2/f34 | 3.355 |
| f2/f3 | −3.730 | f23/f4 | −2.212 |
| f3/f4 | −1.812 | f1/f234 | 0.354 |
| f1/f3 | −0.290 | f123/f4 | 0.764 |
| f1/f4 | 0.525 | f/TL | 0.691 |

Referring to FIGS. 6A and 6B, FIG. 6A shows a four-piece infrared single wavelength lens system in accordance with a sixth embodiment of the present invention, and FIG. 6B shows, in order from left to right, the image plane curve and the distortion curve of the sixth embodiment of the present invention. A four-piece infrared single wavelength lens system in accordance with the sixth embodiment of the present invention comprises a stop 600 and a lens group. The lens group comprises, in order from an object side to an image side: a first lens element 610, a second lens element 620, a third lens element 630, a fourth lens element 640, an IR cut filter 670, and an image plane 680, wherein the four-piece infrared single wavelength lens system has a total of four lens elements with refractive power. The stop 600 is disposed between an object-side surface 611 and an image-side surface 612 of the first lens element 610.

The first lens element 610 with a positive refractive power has the object-side surface 611 being convex near an optical axis 690 and the image-side surface 612 being concave near the optical axis 690, the object-side surface 611 and the image-side surface 612 are aspheric, and the first lens element 610 is made of plastic material.

The second lens element 620 with a positive refractive power has an object-side surface 621 being concave near the optical axis 690 and an image-side surface 622 being convex near the optical axis 690, the object-side surface 621 and the image-side surface 622 are aspheric, and the second lens element 620 is made of plastic material.

The third lens element 630 with a negative refractive power has an object-side surface 631 being concave near the optical axis 690 and an image-side surface 632 being convex near the optical axis 690, the object-side surface 631 and the image-side surface 632 are aspheric, and the third lens element 630 is made of plastic material.

The fourth lens element 640 with a positive refractive power has an object-side surface 641 being convex near the optical axis 690 and an image-side surface 642 being concave near the optical axis 690, the object-side surface 641 and the image-side surface 642 are aspheric, the fourth lens element 640 is made of plastic material, and at least one of the object-side surface 641 and the image-side surface 642 is provided with at least one inflection point.

The IR cut filter 670 made of glass is located between the fourth lens element 640 and the image plane 680 and has no influence on the focal length of the four-piece infrared single wavelength lens system.

The detailed optical data of the sixth embodiment is shown in table 11, and the aspheric surface data is shown in table 12.

TABLE 11

Embodiment 6
f(focal length) = 2.830 mm, Fno = 2.0, FOV = 78 deg.

| surface | | Curvature Radius | | Thickness | Material | Index | Abbe # | Focal length |
|---|---|---|---|---|---|---|---|---|
| 0 | object | infinity | | 700 | | | | |
| 1 | | infinity | | 0.121 | | | | |
| 2 | stop | infinity | | −0.121 | | | | |
| 3 | Lens 1 | 1.696 | (ASP) | 0.456 | plastic | 1.65 | 21.5 | 3.36 |
| 4 | | 7.959 | (ASP) | 0.507 | | | | |
| 5 | Lens 2 | −2.048 | (ASP) | 0.312 | plastic | 1.65 | 21.5 | 46.27 |
| 6 | | −2.024 | (ASP) | 0.209 | | | | |
| 7 | Lens 3 | −1.240 | (ASP) | 0.537 | plastic | 1.65 | 21.5 | −11.26 |
| 8 | | −1.757 | (ASP) | 0.112 | | | | |
| 9 | Lens 4 | 0.965 | (ASP) | 0.578 | plastic | 1.65 | 21.5 | 6.22 |
| 10 | | 0.989 | (ASP) | 0.703 | | | | |
| 11 | IR-filter | infinity | | 0.3 | glass | 1.517 | 64.2 | |
| 12 | | infinity | | 0.365 | | | | |

TABLE 11-continued

Embodiment 6
f(focal length) = 2.830 mm, Fno = 2.0, FOV = 78 deg.

| surface | | Curvature Radius | Thickness | Material | Index | Abbe # | Focal length |
|---|---|---|---|---|---|---|---|
| 13 | Image plane | infinity | infinity | | | | |

TABLE 12

Aspheric Coefficients

| | surface | | | |
|---|---|---|---|---|
| | 3 | 4 | 5 | 6 |
| K: | −7.0191E+00 | −1.5565E+02 | 1.4830E+00 | −1.3136E−01 |
| A: | 1.5332E−01 | −4.1795E−02 | −3.8858E−02 | 6.2002E−01 |
| B: | −1.8249E−01 | −1.7196E−01 | −7.3173E−01 | −1.8227E+00 |
| C: | 1.0711E−01 | 7.9750E−02 | 9.1570E−01 | 2.1553E+00 |
| D: | −2.0703E−01 | −4.7480E−01 | −2.3758E−01 | −1.3229E+00 |
| E: | 1.7302E−01 | 8.3547E−01 | 1.0634E+00 | 8.7879E−01 |
| F | −2.3955E−01 | −5.4450E−01 | −1.0539E+00 | −3.6230E−01 |

| | surface | | | |
|---|---|---|---|---|
| | 7 | 8 | 9 | 10 |
| K: | −1.2853E+01 | −1.9603E+01 | −9.7252E−01 | −8.3679E−01 |
| A: | 6.6162E−01 | −1.6757E−01 | −3.6933E−01 | −3.3040E−01 |
| B: | −1.5202E+00 | 2.9851E−01 | 1.9276E−01 | 1.2796E−01 |
| C: | 1.8806E+00 | −3.2589E−01 | −1.0443E−01 | −4.2692E−02 |
| D: | −1.9691E+00 | 8.0249E−02 | 4.1127E−02 | 8.5800E−03 |
| E: | 1.4179E+00 | 5.6261E−02 | −8.5490E−03 | −8.4100E−04 |
| F | −4.3701E−01 | −2.4346E−02 | 6.8200E−04 | 1.7000E−05 |

In the sixth embodiment, the equation of the aspheric surface profiles of the aforementioned lens elements is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 2.830 | f2/f4 | 7.433 |
| Fno | 2.0 | f1/f23 | −0.250 |
| FOV[deg.] | 78 | f12/f34 | 0.271 |
| f1/f2 | 0.073 | f2/f34 | 3.710 |
| f2/f3 | −4.109 | f23/f4 | −2.155 |
| f3/f4 | −1.809 | f1/f234 | 0.357 |
| f1/f3 | −0.298 | f123/f4 | 0.796 |
| f1/f4 | 0.540 | f/TL | 0.694 |

In the present four-piece infrared single wavelength lens system, the lens elements can be made of plastic or glass. If the lens elements are made of plastic, the cost will be effectively reduced. If the lens elements are made of glass, there is more freedom in distributing the refractive power of the four-piece infrared single wavelength lens system. Plastic lens elements can have aspheric surfaces, which allow more design parameter freedom (than spherical surfaces), so as to reduce the aberration and the number of the lens elements, as well as the total track length of the four-piece infrared single wavelength lens system.

In the present four-piece infrared single wavelength lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The four-piece infrared single wavelength lens system of the present invention can be used in focusing optical systems and can obtain better image quality. The four-piece infrared single wavelength lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A four-piece infrared single wavelength lens system, in order from an object side to an image side, comprising:
   a stop;
   a first lens element with a positive refractive power, having an object-side surface being convex near an optical axis and an image-side surface being concave near the optical axis, at least one of the object-side surface and the image-side surface of the first lens element being aspheric;
   a second lens element with a positive refractive power, having an object-side surface being concave near the optical axis and an image-side surface being convex near the optical axis, at least one of the object-side surface and the image-side surface of the second lens element being aspheric;
   a third lens element with a negative refractive power, having an object-side surface being concave near the optical axis and an image-side surface being convex near the optical axis, at least one of the object-side surface and the image-side surface of the third lens element being aspheric; and
   a fourth lens element with a positive refractive power, having an object-side surface being convex near the optical axis and an image-side surface being concave near the optical axis, at least one of the object-side surface and the image-side surface of the fourth lens element being aspheric;
   wherein a focal length of the second lens element is f2, a focal length of the third lens element is f3, and they satisfy the relation: $-42 < f2/f3 < -3.2$.

2. The four-piece infrared single wavelength lens system as claimed in claim 1, wherein a focal length of the first lens element is f1, the focal length of the second lens element is f2, and they satisfy the relation: $0.005 < f1/f2 < 0.09$.

3. The four-piece infrared single wavelength lens system as claimed in claim 1, wherein the focal length of the third lens element is f3, a focal length of the fourth lens element is f4, and they satisfy the relation: $-2.1 < f3/f4 < -1.3$.

4. The four-piece infrared single wavelength lens system as claimed in claim 1, wherein a focal length of the first lens element is f1, the focal length of the third lens element is f3, and they satisfy the relation: $-0.55 < f1/f3 < -0.15$.

5. The four-piece infrared single wavelength lens system as claimed in claim 1, wherein a focal length of the first lens element is f1, a focal length of the fourth lens element is f4, and they satisfy the relation: $0.35 < f1/f4 < 0.77$.

6. The four-piece infrared single wavelength lens system as claimed in claim 1, wherein the focal length of the second lens element is f2, a focal length of the fourth lens element is f4, and they satisfy the relation: $6.0 < f2/f4 < 68.5$.

7. The four-piece infrared single wavelength lens system as claimed in claim 1, wherein a focal length of the first lens element is f1, a focal length of the second lens element and the third lens element combined is f23, and they satisfy the relation: $-0.55 < f1/f23 < -0.1$.

8. The four-piece infrared single wavelength lens system as claimed in claim 1, wherein a focal length of the first lens element and the second lens element combined is f12, a focal length of the third lens element and the fourth lens element combined is f34, and they satisfy the relation: $0.1 < f12/f34 < 0.45$.

9. The four-piece infrared single wavelength lens system as claimed in claim 1, wherein the focal length of the second lens element is f2, a focal length of the third lens element and the fourth lens element combined is f34, and they satisfy the relation: $2.7 < f2/f34 < 30$.

10. The four-piece infrared single wavelength lens system as claimed in claim 1, wherein a focal length of the second lens element and the third lens element combined is f23, a focal length of the fourth lens element is f4, and they satisfy the relation: $-2.5 < f23/f4 < 1.2$.

11. The four-piece infrared single wavelength lens system as claimed in claim 1, wherein a focal length of the first lens element is f1, a focal length of the second lens element, the third lens element and the fourth lens element combined is f234, and they satisfy the relation: $0.13 < f1/f234 < 0.5$.

12. The four-piece infrared single wavelength lens system as claimed in claim 1, wherein a focal length of the first lens element, the second lens element and the third lens element combined is f123, a focal length of the fourth lens element is f4, and they satisfy the relation: $0.55 < f123/f4 < 1.25$.

13. The four-piece infrared single wavelength lens system as claimed in claim 1, wherein a refractive index of the fourth lens element is N4, an Abbe number of the fourth lens element is V4, and they satisfy the relations: $1.61 < N4$; $V4 < 25$.

14. The four-piece infrared single wavelength lens system as claimed in claim 1, wherein a focal length of the four-piece infrared single wavelength lens system is f, a distance from the object-side surface of the first lens element to an image plane along the optical axis is TL, and they satisfy the relation: $0.5 < f/TL < 0.9$.

* * * * *